Aug. 18, 1959     I. L. JOY     2,900,503
DIODE GATING CIRCUIT
Original Filed Dec. 4, 1952
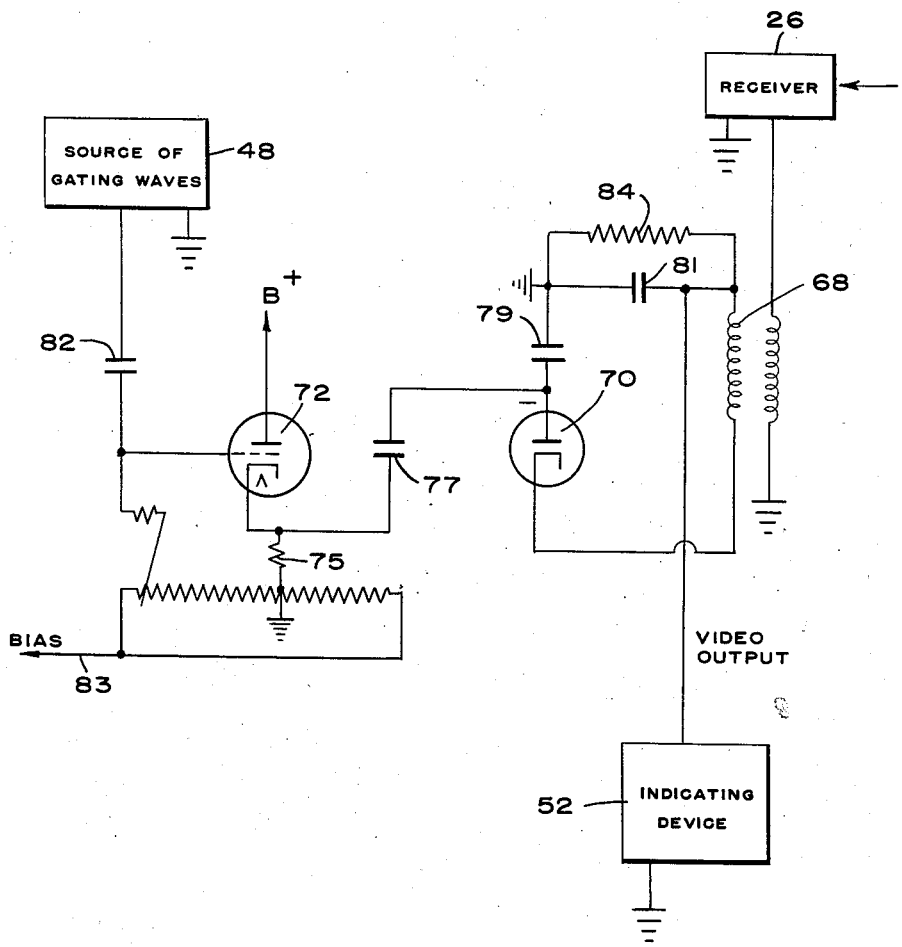
INVENTOR
IVAN L. JOY United States Patent Office 2,900,503
Patented Aug. 18, 1959

2,900,503

DIODE GATING CIRCUIT

Ivan L. Joy, Topeka, Kans.

Original application December 4, 1952, Serial No. 324,104. Divided and this application May 25, 1956, Serial No. 587,415

2 Claims. (Cl. 250—27)

This invention relates to high speed gating circuits and deals with the problem of preventing transient effects in the gating circuit from producing undesired actuations of an indicating device.

In the prior art, resistor and condenser circuits based on the modulation techniques and various neutralizing methods have been employed for this purpose, but the present invention contemplates a different approach for achieving superior results.

Accordingly, the principal object of this invention is to provide a gating circuit arrangement wherein capacitance matching techniques are employed in a circuit arrangement wherein the input signals which are to be gated and the resultant gated output are connected to the same terminal of a uni-directional current path-forming device.

Other objects and advantages of the invention will become apparent as the disclosure proceeds.

The single figure illustrates a preferred embodiment of my invention.

Referring to the drawing for purposes of disclosure, a gating circuit arrangement is shown in association with a suitable receiver device 26 that intermittently receives high frequency signals which may be on the order of ten megacycles, with the signals being supplied through a transformer 68 for delivery to an indicating device 52 which may be a cathode ray oscilloscope having appropriate sweep circuit facilities operating in predetermined timed relation with the signals detected by the receiver 26. A source of gating waves, which may be in the form of positive square waves, is shown at 48 for selectively controlling the gating circuit to pass desired signals from receiver 26 to the indicating device 52.

The positive square waves from source 48 are coupled through a capacitor 82 to the grid of cathode follower tube 72 having a cathode resistor 75 and coupling condenser 77 for applying the gating waves. This circuit is provided with a suitable negative bias from a lead 83 with the square waves being of a value to approximately neutralize the bias. Should the output of tube 72 be applied directly to an RF stage at the receiver device 26, portions of the transients in the square wave would likely represent a frequency equal to ten megacycles and would be amplified, producing unwanted output at the beginning of the square wave and at its end, thus defeating the desired result.

To overcome this difficulty the arrangement shown was developed. Tube 70 is a diode and is connected in a series circuit that comprises the secondary of transformer 68 and capacitors 79 and 81, with the anode of this diode normally being biased negative a sufficient amount to prevent current flow through the series circuit. When square wave output from tube 72 through capacitor 77 is applied to the anode of tube 70, the potential thereof increases in a positive sense to approach zero and thereby condition the series circuit for detecting or rectifying incoming signals from transformer 68 during the time of application of the gating square wave. Condenser 77 is large enough to maintain constant height of the square wave that is supplied from tube 72 to the anode of tube 70. Condenser 79 is small and makes the series circuit complete. This series circuit of diode 70 is tuned to the frequency of the incoming signals from transformer 68 to improve the selectivity and sensitivity of the arrangement.

It should be noted that tube 70 is a diode having low internal capacity, in this case, 3.5 micromicrofarads, whereas condenser 81 may have a value on the order of 100 micromicrofarads. This small internal capacitance of tube 70 can only transmit transient voltage fluctuations to the output video lead connection through the secondary winding of transformer 68 so that the voltage transients supplied from tube 72 appear at the video output reduced by a factor of 3.5 to 100. This results from this matching of capacitance coupled with the fact that the input signals from transformer 68 and the output which appears across capacitor 81 are, in a D.C. circuit sense, connected to the same element of the diode, namely, the cathode.

The operation of the circuit is as follows: Assuming a gating square wave is being supplied from tube 72, the anode of tube 70 will be at approximately zero potential so that the series circuit comprising the secondary of transformer 68 and capacitors 79 and 81 is conditioned for its rectification function. When incoming signals from transformer 68 are received, a current flow is established through this diode circuit, thereby developing output voltage across capacitor 81, which voltage is then transmitted by the video lead to the indicating device. A resistor 84 is shown in parallel with capacitor 81 for regulating the decay characteristic of this voltage.

As can be seen, the negative voltage at the anode of diode 70 can be adjusted to allow rectification of peaks of radio frequency voltage at the cathode of said diode, or all of the radio frequency voltage by a different adjustment. Resistors shown are likewise arranged to be adjusted to accommodate the necessary amplitude ranges involved.

This case is filed as a division of Serial No. 324,103, filed December 4, 1952, now abandoned.

I claim:

1. In an apparatus for controlling the transmission of energy of a specified frequency characteristic from a receiving device to an indicating device, the combination therewith of an electrical gating circuit that produces positive gating pulses, and blocking means including a unidirectional current-path forming means having a current-collecting element and a current-emitting element with the collecting element normally biased negative relative to the emitting element to maintain the current path interrupted, a first circuit in the form of a series loop connecting the elements of the unidirectional current-path forming means and including in series connection with said elements a capacitor and input means, said capacitor being connected between said current-collecting element and said input means, said input means being responsive to and receiving energy from said receiving device, said first circuit being tuned to the frequency characteristic of the energy received by said input means and having said indicating means connected in parallel with said capacitor, said unidirectional current-path forming means having a given capacitance between said elements with said capacitor having a capacitance substantially larger than said given capacitance, and a second circuit connecting the output of said gating circuit to said collecting element such that the positive gating pulses temporarily overcome said negative bias and establish a path through said unidirectional current-path forming means without actuating said indicating means by transients in said gating circuit.

2. In an apparatus for controlling the transmission of energy of a specified frequency characteristic from a receiving device to an indicating device, the combination therewith of an electrical gating circuit that produces output pulses of a given polarity, and blocking means including a unidirectional current-path forming means having a current-collecting element and a current-emitting element with one of said elements biased oppositely to said given polarity to maintain the current path interrupted, a first circuit in the form of a series loop connecting the elements of the unidirectional current-path forming means and including in series connection with said elements a capacitor and input means, said capacitor being connected between said one element and said input means, said input means being responsive to and receiving energy from said receiving device, said first circuit being tuned to the frequency characteristic of the energy received by said input means and having said indicating means connected in parallel with said capacitor, said unidirectional current-path forming means having a given capacitance between said elements with said capacitor having a capacitance substantially larger than said given capacitance, and a second circuit connecting the output of said gating circuit to said one element such that the gating pulses temporarily overcome the bias on said one element and establish a path through said unidirectional current-path forming means without actuating said indicating means by transients in said gating circuit.

References Cited in the file of this patent

UNITED STATES PATENTS

| | | |
|---|---|---|
| 2,459,798 | Dettman | Jan. 25, 1949 |
| 2,483,823 | George | Oct. 4, 1949 |
| 2,485,642 | Newitt | Oct. 25, 1949 |